March 19, 1929.   K. WARGA   1,705,512
APPARATUS FOR DECORATING GLASS SURFACES
Filed Dec. 1, 1927
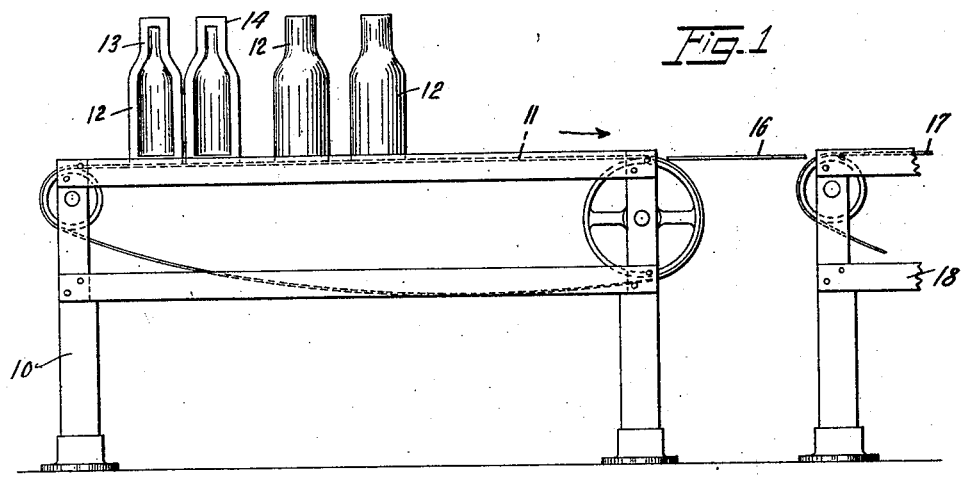
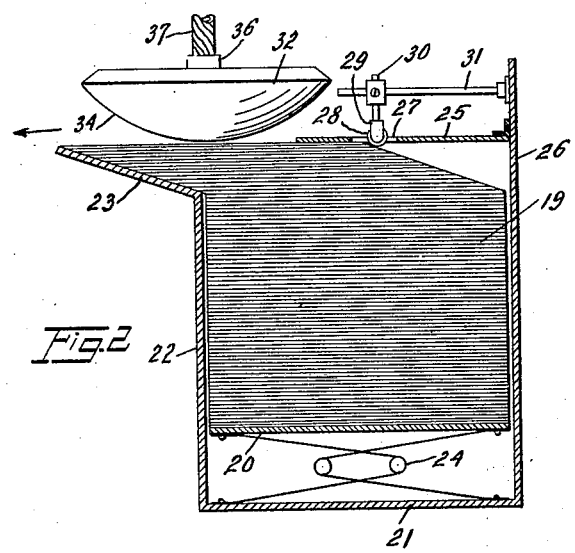
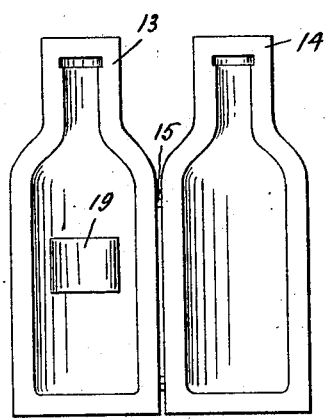
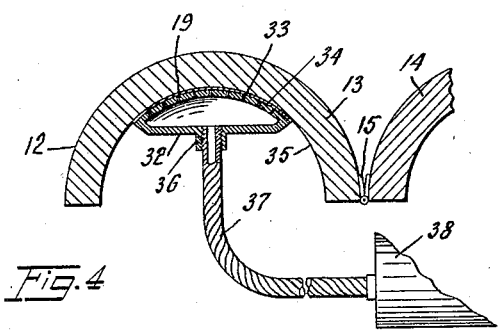
INVENTOR
K. Warga
BY
Sigmund Herzog
ATTORNEY Patented Mar. 19, 1929.

1,705,512

UNITED STATES PATENT OFFICE.

KALMAN WARGA, OF NEW YORK, N. Y., ASSIGNOR TO CLARENCE W. BICKFORD AND MARY BICKFORD, BOTH OF OSCEOLA MILLS, PENNSYLVANIA.

APPARATUS FOR DECORATING GLASS SURFACES.

Application filed December 1, 1927. Serial No. 237,008.

The present invention relates to an apparatus for decorating glass surfaces, more particularly surfaces of glass containers, such as bottles or the like, which are manufactured by the aid of molds. The invention pertains more particularly to an apparatus for carrying out the method of decorating glass surfaces described and claimed in an application for Letters Patent filed by me on November 17, 1927, Ser. No. 234,054.

In the said application a method of fixing designs on glass objects is described which consists in, generally, forming the design in color films, containing each a mineral pigment and a vitreous binding material, said films being printed or otherwise provided on tissue paper and being all fusible at the same temperature. The design is applied to the glass object while the latter is in hot state and within a mold, and the said films are fixed by heat to said glass object while the latter gradually cools in its mold. Going more into details, the several steps of the method described in the said application are performed as follows: The design is produced on tissue paper by means of mineral colors or pigments which are incorporated in or mixed with fluxes or binders of or containing vitreous material. These colors or pigments are mixed with a suitable quantity of flux so as to fuse at the same temperature, or, in other words, so as to have the same melting point. The design is printed upon the paper, preferably, by lithographing, the darkest color in the series being first applied to the paper, the next lighter thereafter, and so on until the lightest color is reached in the last printing step. After all the colors have been applied, the printed surface may be covered with a varnish, while on the back of the paper is spread a layer of rosin. A glass container, manufactured by pressing or blowing, is removed, in hot state, from its mold previous to its entry into the annealing leer. The printed paper, prepared as above stated, is attached by the rosin layer to the interior surface of a mold in proper relation to the surface of the glass container to which it is to be fixed, the container, in its hot state, placed into the mold, and the latter closed and put into the annealing leer. In passing through the leer, the several colors or pigments melt and fix themselves to the glass container. It is obvious that, in printing the design, a reversed image must be produced.

The main object of the present invention is to provide a simple apparatus for removing the printed paper or labels, one after the other, from a stack or pile and depositing the same into the molds prior to the insertion of the hot containers thereinto.

Another object of the invention is to provide a device of the character described in which the means for transferring the labels from the stack or pile to the mold is removably mounted on the apparatus, so that it may be replaced by others according to the sizes of the molds and the labels to be fed to the latter.

A further object of the invention is to provide a label transfer means which removes the labels from the stack or pile by suction, and is provided with a surface giving the label a shape, prior to its insertion into the mold, conforming exactly to that portion of the surface of the container to which it is to be attached.

With these and other objects in view, which will more fully appear as the nature of the invention is better understood, the same consists in the combination, arrangement and construction of parts hereinafter described, pointed out in the appended claim and illustrated in the accompanying drawings, it being understood that many changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1 is a side elevation of a portion of a conveyor on which the molds with the hot containers therein travel to a second conveyor, on which the said molds and the elements therein travel through the annealing leer; Fig. 2 is a central vertical section taken through a label supporting table, showing the label removing and transfer means in elevation and in operative relation to the said stack; Fig. 3 is an elevation of an open mold showing one of the labels attached to the inner surface thereof; and Fig. 4 is a horizontal section taken through the said mold and the label transfer means in operative relation to a section of said mold.

Referring now to the drawings, the numeral 10 indicates a frame, the table portion of which is constituted by a belt conveyor 11, which is actuated in any suitable manner so as to carry objects placed onto the said conveyor in the direction of the arrow shown in Fig. 1 of the drawings. Onto this conveyor are placed, preferably, in upright positions molds 12, suitably shaped and constructed for forming glass containers. In the case illustrated these molds are of the type for forming bottles, each mold consisting of two sections 13 and 14, which are hinged together at 15. Means, not shown, are provided for keeping the mold sections in closing positions. The molds, after having the labels and containers inserted thereinto in a manner hereinafter described, are carried by the conveyor to a stationary table 16 from which they are moved by the succeeding molds onto a belt conveyor 17, which is mounted on a frame 18 of any suitable construction, the last-mentioned conveyor being disposed in an annealing leer through which the molds and the bottles therein travel through lower temperatures and are discharged at the outlet of the leer at nearly atmospheric temperature.

The paper labels 19, prepared as above stated, are placed in a stack, with their printed faces facing up, onto a table 20, the latter being slidably mounted within a housing 21, the front wall 22 of which is provided with a forwardly extending lip 23. The table and the paper stack thereon are automatically raised by a spring mechanism 24, the uppermost label of the stack being thus brought into contact with a stop plate 25 on the said housing. This stop plate partly covers the uppermost label, it extending from the rear wall 26 of the housing toward the front wall 22 thereof, but stopping short of the said front wall so as to permit the label transfer means to engage the uppermost label of the stack, as will be hereinafter described. The stop plate is provided with an aperture 27, through which projects into the housing a roller 28, mounted upon the forked end 29 of an arm 30, which is adjustably mounted upon a horizontally extending bar 31, the latter being fixed to the rear wall 26 of the housing. This roller engages the rear edge of the label next to the top label and prevents the labels lying underneath the top label from being withdrawn from the housing when the top label is being removed from the stack.

The mechanism for transferring the labels, one after the other, from the stack to the molds and applying the same to the interior surfaces of the molds in proper relation to the glass objects to be placed thereinto comprises an air-suction operated device, including a closed casing 32 having a plurality of small perforations 33 in one of its faces, denoted by the numeral 34, the said face being curved and its curvature conforming to that of the inner surface 35 of that section of the mold 12 to which the label is to be applied. This casing is provided with an interiorly screw-threaded nipple 36, with the threads of which mesh those of a, preferably, flexible hose 37, the said hose being connected to a suction device 38.

In use, the perforated curved surface of the casing 32 is brought into contact with the top label of the stack, as shown in Fig. 2 of the drawings, and suction produced in the said casing. When now the casing is moved in the direction of the arrow shown in Fig. 2 of the drawings, the top label is removed from the pile, the suction causing the said label to contact with the curved surface of the casing 32 throughout its length and thereby to assume the exact shape which it is to take on in the mold. The casing, with the label thereon, is then brought into a section of the open mold, as shown in Fig. 4 of the drawings, the label being brought into contact with the inner surface of the said mold section at the place where it is in proper position in relation to the bottle to be inserted into the mold. After this the air suction is discontinued, whereby, upon withdrawing the casing 32 from the mold, the label adheres to the said mold section, as shown in Fig. 3 of the drawings. As stated above, the back of the label has applied to it a layer of rosin and this layer causes the said label to adhere to the mold. After the label has been applied to the mold, a bottle is placed thereinto in its hot state, that is to say in the state in which it is removed from the mold after the molding or blowing operation. The mold is then closed and placed onto the conveyor 11, which carries it to the stationary table section 16. From the latter it is advanced to the conveyor 17, which is disposed in an annealing leer. In passing through the leer, the several colors or pigments melt and fix themselves to the glass container. The paper is consumed while the fixing operation takes place.

Returning now to the label removing operation, it will be noted that as the top label of the stack is removed from the housing 21, the labels below the top label are "combed out," that is to say those labels which are in alignment with the lip 23 are moved somewhat forwards until they are stopped by the said lip.

It is obvious that, while in the drawings a mold has been illustrated for receiving bottles having cylindrical body portions and consequently a label transfer casing has been shown having a curved surface, the curvature of which corresponds to that of the inner surface of the mold, the invention is applicable to molds and label transfer means of any other configuration, the invention lying mainly in the provision of a label transfer means having a perforated surface for imparting to the label the exact shape which it is to assume in the mold. It is also obvious that, while herein a label stack support of a specific construction has been described, any other construction may be made use of without departing from the invention.

Attention is called to the fact that the label transfer casing 32 is removable from the hose 37. The purpose of this arrangement is to permit the transfer casing to be replaced by others when it is intended to apply labels to molds of varying sizes and shapes.

What I claim is:—

An attachment to glass annealing leers including a mechanism for transferring printed labels from a stack to the interior of a hot mold, each label having applied to one of its faces a design of a mineral pigment and flux and on its other face an adhesive which is adapted to be rendered operative by heat, said mechanism comprising a casing having a perforated surface conforming in configuration to that portion of the interior surface of the mold to which the label is to be applied, and suction-operated means connected to said casing which, when in operation, causes the label to adhere with its design bearing face to the perforated surface of said casing and to assume the shape which it is to take in the mold, the adhesive on the label being exposed to be brought into contact with the interior heated surface of the mold to be left thereon when said suction operating means is rendered inoperative.

Signed at New York, in the county of New York, and State of New York, this 28th day of November, A. D. 1927.

KALMAN WARGA.